United States Patent [19]
Congdon et al.

[11] Patent Number: 5,209,897
[45] Date of Patent: May 11, 1993

[54] BWR CORE ASSEMBLY

[75] Inventors: Steven P. Congdon, Los Gatos; Irvin R. Kobsa, San Jose, both of Calif.

[73] Assignee: General Electric Company, San Jose, Calif.

[21] Appl. No.: 836,480

[22] Filed: Feb. 18, 1992

[51] Int. Cl.$^5$ .................................................. G21C 3/00
[52] U.S. Cl. ..................................... 376/352; 376/438; 376/377; 376/462
[58] Field of Search ............... 376/352, 462, 438, 439, 376/304, 377, 373, 399, 353

[56] References Cited

U.S. PATENT DOCUMENTS

| | | | |
|---|---|---|---|
| Re. 28,362 | 3/1975 | Calvin | 376/352 |
| 4,326,922 | 4/1982 | Ferrari et al. | 376/435 |
| 4,832,905 | 5/1989 | Bryan et al. | 376/352 |
| 4,888,152 | 12/1989 | Razafindrazaka | 376/462 |
| 5,032,351 | 7/1991 | Johansson | 376/438 |

FOREIGN PATENT DOCUMENTS 3814860  11/1989  Fed. Rep. of Germany .

OTHER PUBLICATIONS

General Electric Company, "BWR/6, General Description of A Boiling Water Reactor," Revised Sep. 1980, Pages: Title page and back; 1-1, 1-2, 2-1 to 2-3, 3-1 to 3-10, and 3-19.

Wilkins et al, "Advanced BWR: Design Improvements Build On Proven Technology," Jun. 1986, pp. cover, 1-7, and 6-page figure.

Primary Examiner—Donald P. Walsh
Assistant Examiner—Frederick H. Voss
Attorney, Agent, or Firm—Robert R. Schroeder

[57] ABSTRACT

A nuclear reactor core assembly includes a support plate having a plurality of inlets for channeling water to a core lattice fixedly joined thereto. The lattice includes a plurality of flow channels, each including a respective separately removable fuel bundle. In a preferred embodiment, the core lattice includes a plurality of flow dividers joined together for allowing unrestrained expansion and contraction thereof, and which prevent crossflow of water therebetween.

7 Claims, 2 Drawing Sheets

BWR CORE ASSEMBLY

TECHNICAL FIELD

The present invention relates generally to boiling water reactors (BWRs), and, more specifically, to an improved reactor core therein.

BACKGROUND ART

A conventional boiling water reactor (BWR) includes a reactor core including a plurality of laterally spaced apart nuclear fuel bundles immersed in water. Each of the fuel bundles includes a plurality of fuel rods joined together in a conventional square array, for example, which are completely surrounded on four sides by a correspondingly square fuel or flow channel or tube. The bottom of the flow channel is joined to a conventional conical nosepiece through which water is channeled into the flow channel and upwardly between adjacent ones of the fuel rods and outwardly from an outlet at the top of the flow channel.

Adjacent fuel bundles are laterally spaced apart to define bypass channels between adjacent ones of the flow channels which bypass upwardly water flow around the flow channels. Furthermore, conventional cruciform control rods are also disposed in selected ones of the bypass channels and are selectively translatable upwardly and downwardly for being inserted and withdrawn between adjacent fuel bundles for controlling reactivity of the core fuel.

During operation of the reactor, water is channeled upwardly inside each of the fuel bundles within the flow channels and in parallel flow upwardly between adjacent fuel bundles through the bypass channels. The water inside the fuel bundles is progressively heated and boiled for generating steam which is conventionally used as a power source. The water channeled upwardly through the bypass channels, however, receives less heat from the fuel rods than the water inside the flow channels and does not boil or generate any substantial amount of steam. Accordingly, the bypass water is more effective as a neutron moderator than the water being boiled inside the flow channels and effects neutron flux peaking around the perimeter of the fuel bundles which varies the degree of reactivity and corresponding output power through each of the fuel bundles. In order to obtain a more uniform output power from each of the fuel bundles, a conventional fuel bundle typically includes less enrichment in the fuel rods around the perimeter of each of the fuel bundles which increases the cost of manufacturing the fuel bundles.

Furthermore, the flow channels around each of the fuel bundles are required to ensure that the water is progressively heated and boiled as it flows upwardly along the fuel rods for controlling the resulting steam void fraction. The flow channels, therefore, confine the water flow within each of the flow channels and prevent lateral crossflow of the water between adjacent fuel bundles for ensuring acceptable reactor performance. Furthermore, the spaced apart flow channels also provide the bypass channel therebetween through which the conventional cruciform control rods may be selectively translated for controlling reactivity of the core fuel.

However, the pressure within each of the flow channels varies longitudinally from the bottoms to the tops thereof, and a differential pressure exists across each of the flow channels from the inside thereof to the outside thereof in the bypass channels. The pressure of the boiling water inside the flow channels is greater than the pressure of the water being channeled upwardly through the bypass channels which produces pressure forces acting on the flow channels. Over the course of operation of the reactor core, such pressure forces typically lead to permanent distortion of the flow channels which requires the replacement thereof at periodic intervals.

Conventional flow channels are typically subject to expansion thereof from thermal expansion and from irradiation growth due to the neutrons released during nuclear reactions. For example, conventional flow channels are typically made of conventionally known Zircaloy which expands during operation of the reactor core, which expansion leads to additional permanent distortion of the flow channels during operation. Accordingly, the fuel channels are replaced relatively frequently, for example once per fuel bundle lifetime, which increases the cost of maintaining the nuclear reactor.

OBJECTS OF THE INVENTION

Accordingly, one object of the present invention is to provide a new and improved boiling water reactor core.

Another object of the present invention is to provide an improved core having reduced distortion during operation due to thermal expansion or irradiation growth.

Another object of the present invention is to provide an improved core which reduces flux peaking between adjacent fuel bundles.

Another object of the present invention is to provide an improved core which eliminates the bypass channels between adjacent fuel bundles.

DISCLOSURE OF INVENTION

A nuclear reactor core includes a support plate having a plurality of inlets for channeling water to a core lattice fixedly joined thereto. The lattice includes a plurality of flow channels, each including a respective fuel bundle. In a preferred embodiment, the core lattice includes a plurality of flow dividers joined together for allowing unrestrained expansion and contraction thereof.

BRIEF DESCRIPTION OF DRAWINGS

The novel features believed characteristic of the invention are set forth and differentiated in the claims. The invention, in accordance with a preferred and exemplary embodiment, together with further objects and advantages thereof, is more particularly described in the following detailed description taken in conjunction with the accompanying drawings in which:

FIG. 5 is an enlarged, transverse sectional view of portions of an exemplary flow divider and adjacent supporting posts as shown in FIG. 3.

MODE(S) FOR CARRYING OUT THE INVENTION

Figure 1:
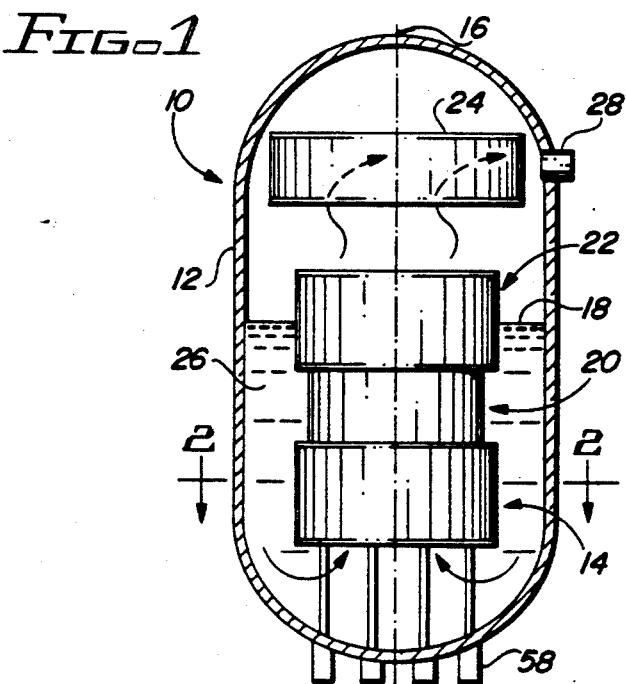
FIG. 1 is an elevational, schematic representation of a boiling water reactor having a core in accordance with one embodiment of the present invention.

Illustrated schematically in FIG. 1 is an exemplary boiling water reactor (BWR) 10 including a cylindrical pressure vessel 12 containing a nuclear reactor core assembly 14 in accordance with one embodiment of the present invention. The core 14 is disposed in the pressure vessel 12 along a common longitudinal centerline axis 16 and is completely immersed in water 18. A conventional chimney 20 extends upwardly from the core 14, and a plurality of conventional steam separators 22 are conventionally disposed above the chimney 20, and in turn, a conventional steam dryer 24 is disposed upwardly from the separators 22.

Surrounding the core 14, chimney 20, and steam separators 22 is a conventional annular downcomer 26 which channels a portion of the water 18 downwardly to the bottom of the pressure vessel 12 and below the core 14. The water 18 flows upwardly through the core 14 wherein it is boiled by the release of heat in conventional nuclear fission reactions for generating a steam and water mixture from which the steam is extracted by the separators 22, with any remaining moisture being additionally extracted by the steam dryer 24 before being discharged from the vessel 12 through a conventional outlet nozzle 28.

Figure 2:
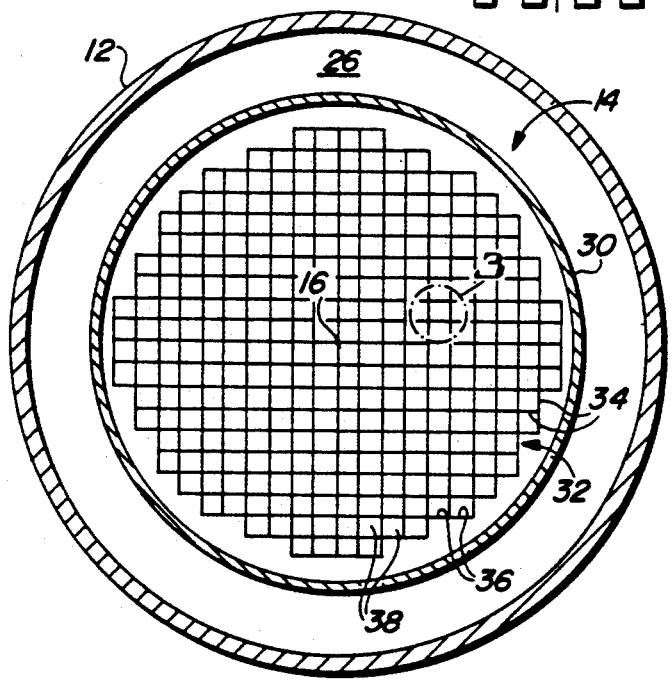
FIG. 2 is a transverse sectional view the reactor illustrated in FIG. 1 taken along line 2—2 through the core thereof.

Illustrated in FIG. 2 is a transverse, or lateral section of the BWR 10 through the core 14 illustrating the core 14 in more particularity. More specifically, the core 14 includes a cylindrical core shroud 30 disposed coaxially with the longitudinal axis 16 and spaced radially inwardly from the pressure vessel 12 to define the downcomer 26. Disposed inside the shroud 30 is a core lattice 32 in accordance with the present invention which includes a plurality of longitudinally extending flow dividers 34 in the form of plates which are laterally spaced apart to define a plurality of longitudinally extending flow channels 36 which are square in this exemplary embodiment. A plurality of fuel bundles 38 are removably disposed in the core lattice 32, with each bundle 38 being disposed in a respective one of the flow channels 36 and being conventionally effective for boiling the water 18 during operation.

Figure 3:
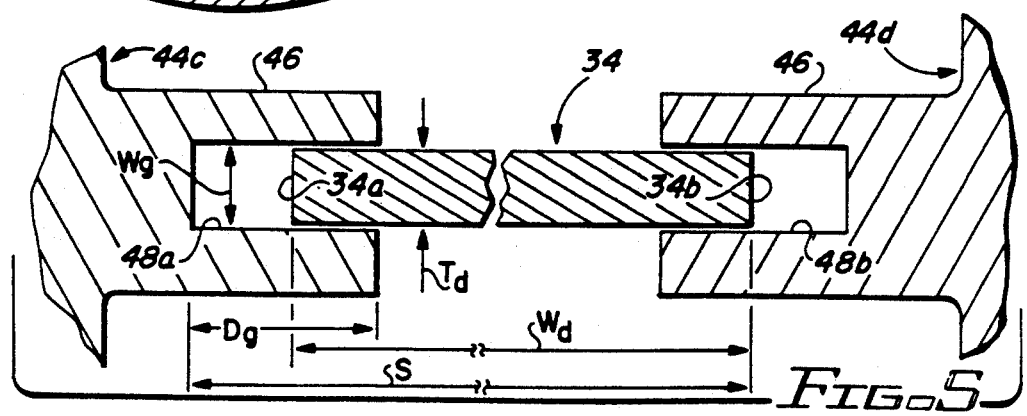
FIG. 3 is an enlarged, transverse sectional view of a portion of the core illustrated in FIG. 2 within the dashed circle labeled 3.
Figure 3:
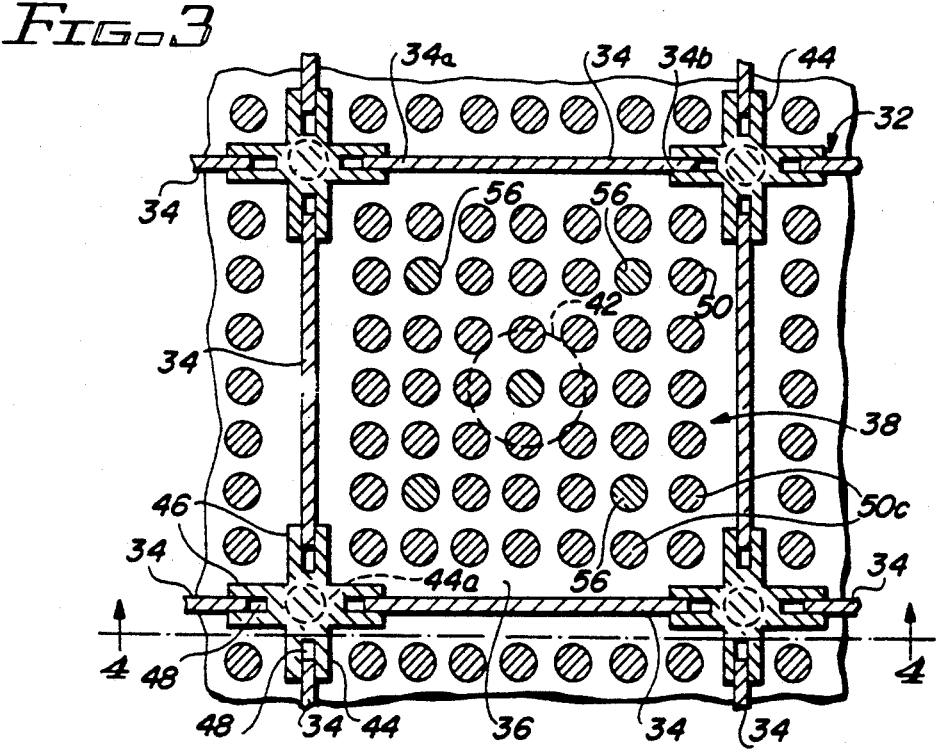
Figure 4:
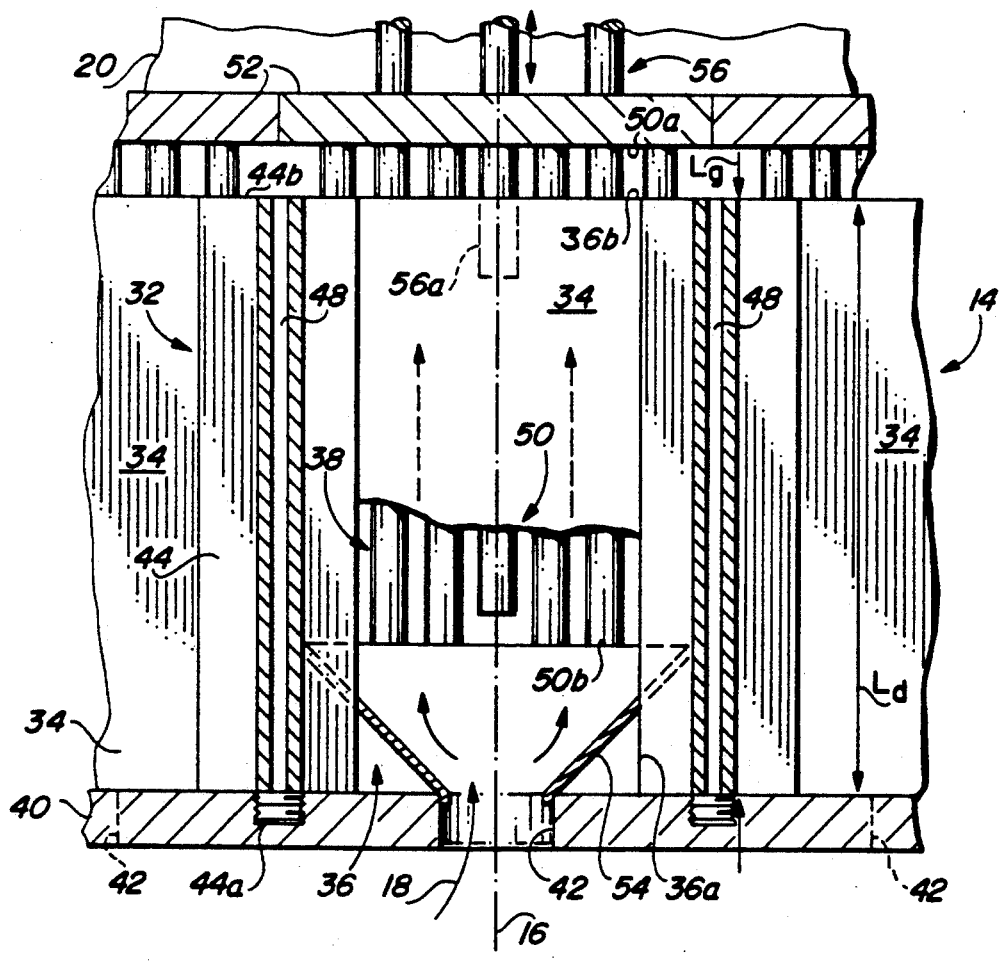
FIG. 4 is a longitudinal, partly sectional elevational view of the portion of the core illustrated in FIG. 3 taken generally along line 4—4.

Illustrated in more particularity in FIGS. 3 and 4 is an exemplary one of the flow channels 36 having therein an exemplary one of the fuel bundles 38. The core 14 includes a bottom core support plate 40 as shown in FIG. 4 which includes a plurality of laterally spaced apart water inlets 42 for receiving the water 18 from the bottom of the pressure vessel 12 (see FIG. 1). The core lattice 32 in accordance with the present invention is fixedly joined to the support plate 40 as described in more detail below with the flow channels 36 being disposed in flow communication with respective ones of the inlets 42 for channeling therethrough the water 18 received therefrom. In a conventional boiling water reactor, flow channels integrally surround each of the fuel bundles and are inserted and removed from the core with the fuel bundles. In contrast, the core lattice 32 defining the flow channels 36 is fixedly joined to the support plate 40 in a substantially permanent installation, with only the fuel bundles 38 being selectively insertable and removable from each of the flow channels 36.

More specifically, means are provided in the form of a plurality of longitudinally extending posts 44 for joining together adjacent ones of the dividers 34 for allowing unrestrained expansion and contraction of the dividers 34 during operation. During operation of the core 14, the fuel bundles 38 emit neutron radiation and boil the water 18 by fission reactions. The heated water 18 in turn heats the flow dividers 34 causing them to expand, which also contract during cooling. And, the neutron radiation also causes additional expansion of the dividers 34, which is conventionally known as irradiation growth thereof when the dividers are formed from conventional materials such as Zircaloy as used in the preferred embodiment. In a conventional fuel bundle having an integral surrounding flow channel, such expansion and contraction leads to permanent distortion of the flow channel which, therefore, must be periodically replaced. In accordance with one feature of the present invention, the flow channels 36 are not only formed independently of the fuel bundles 38, but are also joined to the support plate 40 through the posts 44 for allowing unrestrained expansion and contraction thereof for reducing and possibly eliminating such permanent distortion thereof.

As shown in more particularity in FIG. 4, each of the posts 44 includes a proximal end 44a in the exemplary form of a screw which is fixedly joined to the support plate 40 by being screwed into a corresponding threaded hole therein. The posts 44 extend longitudinally upwardly from the support plate 40 and include a distal end 44b which is free or unsupported in the exemplary embodiment illustrated, or may, alternatively, be suitably supported in a top support plate (not shown). In the exemplary embodiment illustrated in FIGS. 2–4, the core lattice 32 is configured with adjacent flow dividers 34 being disposed perpendicularly to each other so that the flow channels 36 are square, while in alternate embodiments of the invention, the flow channels 36 may take any other conventional form such as hexagons. For the square flow channels 36 in the exemplary embodiment, each of the posts 44 correspondingly has a cruciform transverse configuration as shown in more particularity in FIG. 3, including four legs 46. Each post 44 also includes a plurality of longitudinally extending grooves 48 disposed in respective ones of the legs 46. Each of the dividers 34 includes a pair of longitudinally extending first and second laterally opposite edges 34a and 34b, respectively, which are slidably disposed in respective ones of the post grooves 48.

More specifically, and referring to FIG. 5, adjacent first and second ones of the posts 44, designated 44c and 44d, include longitudinally extending first and second ones of the grooves 48 designated 48a and 48b, respectively. The grooves 48a, 48b extend into the legs to a depth $D_g$ measured to the groove bases. The first and second grooves 48a, 48b are laterally spaced apart to define a groove spacing S therebetween as measured between the respective bases thereof. The divider first and second edges 34a, 34b are laterally spaced apart to define a width $W_d$ of the divider 34. Each of the dividers 34 is preferably rectangular and includes a height or length $L_d$ (as shown in FIG. 4) which extends for the length $L_g$ of the grooves 48 from the top of the support plate 40 to the top of the posts 44. Each of the dividers 34 also has a thickness $T_d$, with each of the grooves 48 having a corresponding width $W_g$.

The first and second divider edges 34a and 34b are slidably disposed in the respective first and second grooves 48a and 48b for allowing unrestrained expansion and contraction of the dividers 34 while still supporting the dividers 34 laterally against any differential pressure forces between adjacent flow channels 36. This may be accomplished by having the divider width $W_d$ predeterminedly less than the groove spacing S for allowing both expansion and contraction of the divider 34 in the first and second grooves 48a and 48b laterally, or in the transverse plane, along the divider width $W_d$. The first and second grooves 48a and 48b, of course, also provide unrestrained expansion and contraction of the dividers 34 in the longitudinal direction as well.

The thickness $T_d$ of the dividers 34 is suitably less than the width $W_g$ of the grooves 48 for allowing unrestrained sliding therein while minimizing leakage of the water 18 between adjacent flow channels 36 through the grooves 48. In the preferred embodiment, the flow dividers 34 are imperforate for ensuring that substantially all of the water 18 received from the inlets 42 is channeled upwardly through each of the respective flow channels 36 without substantial leakage or crossflow between adjacent flow channels 36.

Accordingly, conventional flow channels fixedly attached to each of the fuel bundles 38 are eliminated, with flow separation between adjacent fuel bundles 38 being provided instead by the permanent core lattice 38 having the flow dividers 34 defining the flow channels 36. The core lattice 32 allows the flow dividers 34 to expand and contract without restraint which eliminates any distortion thereof which would otherwise occur with conventionally restrained flow channels. Assembly of the core lattice 32 is relatively simple with the posts 44 being individually fixedly joined to the support plate 40, by being screwed therein for example, and the flow dividers 34 being simply inserted downwardly into the respective grooves 48. The grooves 48 retain the dividers 34 in a vertical orientation for separating water flow between adjacent flow channels 36 while allowing the unrestrained expansion and contraction thereof. In this way, thermal and irradiation distortion of the flow dividers 34 is reduced if not eliminated. The life of the flow channels 36 is accordingly prolonged over conventional flow channels formed integrally with the fuel bundles 38, for reducing both manufacturing and disposal costs.

Furthermore, each of the fuel bundles 38 may be made simpler by the elimination of the conventionally provided integral flow channel as shown in FIGS. 3 and 4. Each of the fuel bundles 38 conventionally includes a plurality of transversely spaced apart fuel rods 50 configured in a conventional square lattice array including any suitable number of individual fuel rods 50. The fuel rods 50 extend downwardly into the flow channels 36 and are disposed in fluid contact with the water 16 flowable through the channels 36.

More specifically, each of the flow channels 36 includes a bottom 36a defined by the flow divider 34 adjacent to the top of the support plate 40 as shown in FIG. 4, and a top 36b defined by the tops of the flow dividers 34 spaced longitudinally upwardly from the support plate 40 at the divider length $L_d$. Each of the fuel bundles 38 includes an upper plate 52 disposed at the flow channel top 36b, with each of the fuel rods 50 including a proximal end 50a conventionally fixedly joined to the upper plate 52. The fuel rods 50 extend downwardly into the flow channel 36, and each includes a distal end 50b disposed adjacent to the top of the support plate 40 over which is first channeled the water 18 from the inlet 42. The fuel rod distal ends 50b are suitably supported by a conventional conical nosepiece 54 which is aligned coaxially with the inlet 42 in flow communication therewith and which supports the weight of the fuel bundle 38 on the support plate 40 in a conventional fashion. The upper plates 52 may be in the form of conventional tie plates disposed either above the tops of the posts 44 and the flow dividers 34 or, alternatively, they may be disposed inside the flow channels 36 at the top 36b thereof. In the exemplary embodiment illustrated in FIG. 4, the upper plates 52 are sized to abut each other for providing lateral restraint of the adjacent fuel bundles 38.

During operation, the water 18 enters the inlets 42 and flows upwardly through the respective flow channels 36 from the fuel rod distal ends 50b toward the fuel rod proximal ends 50a and is discharged upwardly and out from the flow channel tops 36. As shown in FIG. 3, the lattice array of fuel rods 50 includes outermost fuel rods designated 50c which collectively define a perimeter of each fuel bundle 38. The outermost fuel rods 50c are preferably transversely spaced from the flow dividers 34 and the posts 44 for allowing flow of the water 18 therebetween without obstruction. In a conventional fuel bundle, an integral flow channel is provided around the outermost fuel rods 50c for confining flow of the water 18 through each of the fuel bundles 38 without crossflow between adjacent bundles. However, by eliminating such conventional integral flow channels around each of the fuel bundles 38, the flow dividers 34 instead are used to prevent crossflow of the water 18 between adjacent fuel bundles 38. Using the flow dividers 34 also eliminates the conventional bypass channels formed between adjacent fuel bundles, which therefore eliminates the cooler, non-boiling water conventionally channeled therethrough. This arrangement eliminates the neutron moderation effected by the bypass channels and, therefore, reduces neutron flux peaking around the perimeters of the fuel bundles 38. A more uniform enrichment distribution of the fuel rods 50 may, therefore, be used for thereby reducing manufacturing and engineering costs associated with the fuel bundles.

The elimination of the conventional bypass channels between adjacent fuel bundles also eliminates the pressure drop between the bypass channel and the fuel bundles which would otherwise occur and the resulting pressure forces therebetween. The flow dividers 34, therefore, have a more uniform pressure acting on both sides thereof between adjacent fuel bundles 38 which reduces or eliminates pressure caused distortion of the flow dividers 34 for improving the useful life thereof.

However, with the elimination of the conventional bypass channels between adjacent fuel bundles 38, the conventional cruciform control rods which were located therein can no longer be used. Accordingly, a plurality of conventional control rods 56 in the form of fingers, or slender cylindrical rods, are provided, and are selectively translatable upwardly and downwardly through corresponding apertures in the upper plate 52 and between adjacent fuel rods 50 in at least one, and preferably in a plurality, of the fuel bundles 38. Five control rods 56 are shown in FIG. 3 with crosshatching opposite to that of the fuel rods 50 for illustrative purposes only. The actual number of control rods 56 and fuel rods 50 may be conventionally determined for effective operation.

Conventional control rod drives 58 illustrated schematically in FIG. 1 are suitably provided at the bottom of the vessel 12, or at the top of the vessel 12, for selectively translating the control rods 56 illustrated in FIG. 4 upwardly and downwardly for controlling reactivity in the core 14. The control rods 56 are shown in solid line in FIG. 4 in their fully inserted position inside the fuel bundles 38, and with one being shown partly in dashed line designated 56a in a substantially withdrawn position inside the chimney 20 in this exemplary embodiment.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims.

We claim:

1. A nuclear reactor core having a longitudinal centerline axis comprising:
    a support plate having a plurality of inlets for receiving water;
    a core lattice joined to said support plate and having a plurality of longitudinally extending flow channels disposed in flow communication with respective ones of said inlets for channeling therethrough said water received from said inlets, said core lattice including:
        a plurality of longitudinally extending flow dividers laterally spaced apart to define said flow channels therebetween; and
        means for joining together adjacent ones of said dividers for allowing unrestrained expansion and contraction of said joined together dividers, said divider joining means comprising a plurality of posts fixedly joined to said support plate, each of said posts having a plurality of longitudinally extending grooves, and each of said dividers including an edge slidably disposed in a respective one of said post grooves; and
    a plurality of fuel bundles, each fuel bundle being disposed in a respective one of said flow channels, and being effective for boiling said water.

2. A core according to claim 1 wherein:
    adjacent first and second ones of said posts include longitudinally extending first and second ones of said grooves spaced laterally apart to define a groove spacing therebetween;
    each of said dividers includes longitudinally extending first and second opposite ones of said edges spaced laterally apart to define a width of said divider, said first and second edges being slidably disposed in said first and second grooves, respectively; and
    said divider width being less than said groove spacing for allowing unrestrained expansion of said divider in said first and second grooves.

3. A core according to claim 2 further including a plurality of fuel bundles, each of said fuel bundles being disposed in a respective one of said flow channels and including a plurality of fuel rods disposed in fluid contact with said water flowable through said flow channel, said fuel rods of each of said fuel bundles being configured in a lattice array including outermost ones of said fuel rods being spaced from said flow dividers for allowing flow of said water therebetween without obstruction.

4. A core according to claim 3 wherein:
    each of said flow channels includes a bottom disposed adjacent to said support plate, and a top disposed longitudinally upwardly from said bottom;
    each of said fuel bundles includes an upper plate disposed at said flow channel top; and
    each of said fuel rods includes a proximal end fixedly joined to said upper plate, and a distal end disposed adjacent to said support plate.

5. A core according to claim 4 wherein said upper plates abut each other for providing lateral restraint.

6. A core according to claim 4 further including a plurality of control rods selectively translatable upwardly and downwardly through said upper plate and between adjacent ones of said fuel rods in at least one of said fuel bundles.

7. A core according to claim 4 wherein:
    said core lattice is configured so that said flow channels are square; and
    each of said posts has a cruciform transverse configuration including four leg, each of said legs including one of said grooves receiving a respective one of said divider edges.

* * * * *